United States Patent
Shikida et al.

(10) Patent No.: US 10,992,499 B2
(45) Date of Patent: Apr. 27, 2021

(54) RADIO APPARATUS, CHANNEL ESTIMATION METHOD, NON-TRANSITORY COMPUTER READABLE MEDIUM, AND RADIO COMMUNICATION SYSTEM

(71) Applicant: NEC CORPORATION, Tokyo (JP)

(72) Inventors: Jun Shikida, Tokyo (JP); Kazushi Muraoka, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/043,308

(22) PCT Filed: Jan. 30, 2019

(86) PCT No.: PCT/JP2019/003258
§ 371 (c)(1),
(2) Date: Sep. 29, 2020

(87) PCT Pub. No.: WO2019/215964
PCT Pub. Date: Nov. 14, 2019

(65) Prior Publication Data
US 2021/0021446 A1   Jan. 21, 2021

(30) Foreign Application Priority Data

May 8, 2018  (JP) ................................. 2018-089777

(51) Int. Cl.
*H04B 7/06* (2006.01)
*H04L 25/02* (2006.01)
*H04L 27/26* (2006.01)

(52) U.S. Cl.
CPC ........ *H04L 25/0204* (2013.01); *H04L 25/022* (2013.01); *H04L 27/2628* (2013.01)

(58) Field of Classification Search
CPC .............. H04L 25/0204; H04L 25/022; H04L 27/2628
See application file for complete search history.

(56) References Cited

U.S. PATENT DOCUMENTS

2015/0256244 A1   9/2015   Yu et al.
2018/0343044 A1 * 11/2018   Athley ................... H04B 7/088

FOREIGN PATENT DOCUMENTS

| JP | 3044899 B2 | 5/2000 |
| JP | 2007-300512 A | 11/2007 |
| WO | 2018/083522 A1 | 5/2018 |

OTHER PUBLICATIONS

Jun Shikida et al., "Performance Evaluation of Beam Space Channel Estimation for Massive MIMO Systems", Proceedings of the 2017 IEICE Society Conference, B-5-41, Sep. 2017, p. 290.

(Continued)

*Primary Examiner* — David S Huang

(57) ABSTRACT

A radio apparatus (10) includes an estimation unit (2) configured to calculate an estimated value of a channel response for each of a plurality of antennas, a padding unit (3) configured to generate a first antenna-space channel vector having dimensions larger than the number of the antennas by combining the estimated value with a padding value, a spatial transformation unit (4) configured to calculate a first beam-space channel vector by spatial transforming the first antenna-space channel vector, a noise suppression unit (5) configured to generate a second beam-space channel vector by suppressing at least one element of the first beam-space channel vector, an inverse spatial transformation unit (6) configured to calculate a second antenna-space channel vector by inversely and spatial transforming the second beam-space channel vector, and an extraction unit (7) configured to determine an estimated value of each channel based on the second antenna-space channel vector.

14 Claims, 10 Drawing Sheets

(56) References Cited

OTHER PUBLICATIONS

Jun Shikida et al., "Beam Space Channel Estimation Using Multiple DFT Matrices for Massive MIMO System", IEICE Technical Report, RCS2017-392, Feb. 21, 2018, pp. 405-410, vol. 117, No. 456.

Jun Shikida et al., "Performance Evaluation of Coordinated Beamforming for Massive MIMO System", Proceedings of the 2017 IEICE General Conference: Communication 1, B-5-95, Mar. 7, 2017, p. 431.

International Search Report of PCT/JP2019/003258 dated Apr. 2, 2019 [PCT/ISA/210].

* cited by examiner

RADIO APPARATUS, CHANNEL ESTIMATION METHOD, NON-TRANSITORY COMPUTER READABLE MEDIUM, AND RADIO COMMUNICATION SYSTEM

CROSS REFERENCE TO RELATED APPLICATIONS

This application is a National Stage of International Application No. PCT/JP2019/003258, filed Jan. 30, 2019, claiming priority to Japanese Patent Application No. 2018-089777, filed May 8, 2018, the contents of all of which are incorporated herein by reference in their entirety.

TECHNICAL FIELD

The present disclosure relates to a radio apparatus, a channel estimation method, a non-transitory computer readable medium, and a radio communication system.

BACKGROUND ART

Recent radio apparatuses such as base stations for mobile phones and access points for wireless LANs (Local Area Networks) are often equipped with a plurality of antennas in order to perform high-speed communication. In order to detect a desired signal from signals received through the plurality of antennas and/or transmit a signal in a desired direction by using the plurality of antennas, information about a radio propagation path (hereinafter referred to as a channel) is required.

Regarding the technique for acquiring information about a channel, Patent Literature 1 discloses a method for estimating a frequency response of a channel as a method for acquiring information about a channel. Specifically, firstly, a signal including a reference signal (or a pilot signal) transmitted by another radio apparatus is received and, for each subcarrier, a temporary frequency response is estimated by dividing the received signal by the reference signal. Next, an impulse response is calculated by performing an inverse Fourier transform on the estimated temporary frequency response. Then, for a delay tap of which the magnitude of the impulse response is smaller than a threshold, the value of the impulse response is replaced by zero. Lastly, a frequency response is estimated by performing a Fourier transform on the impulse response of which the value has been replaced by zero. In the method disclosed in Patent Literature 1, noise components are removed by replacing the values of impulse responses of taps in which noise components seem to be dominant by zero, so that the estimation accuracy of the frequency response of the channel is improved.

Further, a technique for estimating a frequency response of a channel by using a spatial transformation process between an antenna space and a beam space has also been studied (e.g., Non-patent Literature 1).

Non-patent Literature 1 discloses a method for estimating a frequency response of a channel by using a spatial transformation process between an antenna space and a beam space. Specifically, firstly, a signal including a reference signal transmitted by another radio apparatus is received and, for each antenna, a temporary frequency response is estimated by dividing the received signal by the reference signal. Next, a frequency response in a beam space is calculated by spatial transforming the temporary frequency responses for the plurality of antennas. Then, for a beam for which the magnitude of the frequency response is smaller than a threshold, the value of the frequency response is replaced by zero. Lastly, a frequency response for each antenna is estimated by inversely and spatial transforming the frequency response in the beam space of which the value has been replaced by zero. In the method disclosed in Non-patent Literature 1, noise components are removed by replacing the values of frequency responses of beams in which noise components seem to be dominant by zero, so that the estimation accuracy of the frequency response of the channel is improved. Note that in the method disclosed in Non-patent Literature 1, the closer the direction of the beam is to the direction of the dominant path, the smaller number of beams the components of the dominant path concentrate on. Therefore, the noise components that can be removed increase and hence the level of improvement in the estimation accuracy of the frequency response rises.

CITATION LIST

Patent Literature

Patent Literature 1: Japanese Patent No. 3044899

Non Patent Literature

Non-patent Literature 1: Shikida et al., "Performance Evaluation of Beam Space Channel Estimation for Massive MIMO Systems" 2017 IEICE Society Conference, B-5-41, September 2017.

SUMMARY OF INVENTION

Technical Problem

Note that in the case where a spatial transformation process between an antenna space and a beam space is used as in the case of the method disclosed in Non-patent Literature 1, the number of beams is limited to the same number as the number of antennas because a discrete Fourier transform having a size equivalent to the number of antennas is used for the spatial transformation process. Therefore, in some cases, the angular difference between the direction of the beam and the direction of the dominant path becomes large. In such cases, the level of improvement in the estimation accuracy of the frequency response is small.

An object of the present disclosure is to solve the above-described problem and thereby to provide a radio apparatus, a channel estimation method, a non-transitory computer readable medium, and a radio communication system capable of improving channel estimation accuracy when a spatial transformation between an antenna space and a beam space is used.

Solution to Problem

A radio apparatus according to the present disclosure includes:
- an estimation unit configured to calculate an estimated value of a channel response for each of a plurality of antennas;
- a padding unit configured to generate a first antenna-space channel vector having dimensions larger than the number of the plurality of antennas by combining the estimated value with a padding value;
- a spatial transformation unit configured to calculate a first beam-space channel vector by performing a spatial transformation process on the first antenna-space channel vector;

a noise suppression unit configured to generate a second beam-space channel vector by suppressing at least one element included in the first beam-space channel vector;

an inverse spatial transformation unit configured to calculate a second antenna-space channel vector by performing an inverse spatial transformation process on the second beam-space channel vector, the inverse spatial transformation process being a spatial transformation process in a direction reverse to that of the spatial transformation process; and an extraction unit configured to extract elements each of which corresponds to a respective one of the plurality of antennas as estimated values of the channel responses based on the second antenna-space channel vector.

A channel estimation method according to the present disclosure includes:

calculating an estimated value of a channel response for each of a plurality of antennas;

generating a first antenna-space channel vector having dimensions larger than the number of the plurality of antennas by combining the estimated value with a padding value;

calculating a first beam-space channel vector by performing a spatial transformation process on the first antenna-space channel vector;

generating a second beam-space channel vector by suppressing at least one element included in the first beam-space channel vector;

calculating a second antenna-space channel vector by performing an inverse spatial transformation process on the second beam-space channel vector, the inverse spatial transformation process being a spatial transformation process in a direction reverse to that of the spatial transformation process; and extracting elements each of which corresponds to a respective one of the plurality of antennas as estimated values of the channel responses based on the second antenna-space channel vector.

Advantageous Effects of Invention

According to the present disclosure, it is possible to provide a radio apparatus, a channel estimation method, a non-transitory computer readable medium, and a radio communication system capable of improving channel estimation accuracy when a spatial transformation between an antenna space and a beam space is used.

DESCRIPTION OF EMBODIMENTS

Example embodiments according to the present disclosure will be described hereinafter with reference to the drawings. Note that the following descriptions and the drawings are partially omitted and simplified as appropriate for clarifying the explanation. Further, the same symbols are assigned to the same elements throughout the drawings, and redundant explanations are omitted as necessary.

Overview of Example Embodiment

Figure 1:
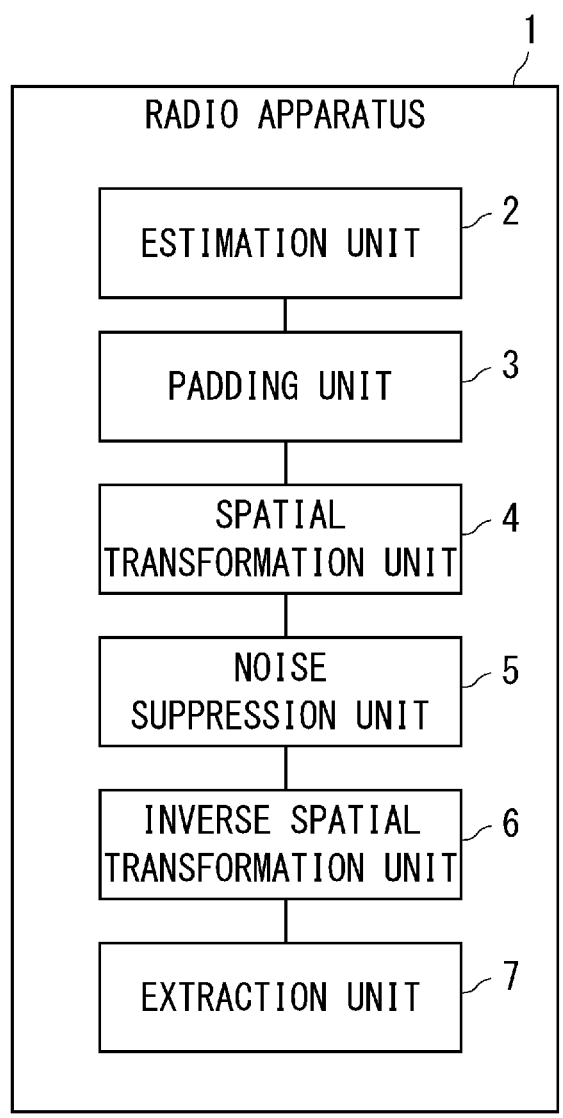
FIG. 1 shows an overview of a radio apparatus 1 according to an example embodiment of the present disclosure.

Prior to explaining an example embodiment according to the present disclosure, an outline of the example embodiment will be described. FIG. 1 shows an outline of a radio apparatus 1 according to an example embodiment of the present disclosure.

The radio apparatus 1 includes an estimation unit 2, a padding unit 3, a spatial transformation unit 4, a noise suppression unit 5, an inverse spatial transformation unit 6, and an extraction unit 7.

The estimation unit 2 calculates an estimated value of a channel response for each of a plurality of antennas.

The padding unit 3 generates a first antenna-space channel vector having dimensions larger than the number of the plurality of antennas by combining the estimated values calculated by the estimation unit 2 with padding values.

The spatial transformation unit 4 calculates a first beam-space channel vector by performing a spatial transformation process on the first antenna-space channel vector generated by the padding unit 3.

The noise suppression unit 5 generates a second beam-space channel vector by suppressing at least one element included in the first beam-space channel vector calculated by the spatial transformation unit 4.

The inverse spatial transformation unit 6 calculates a second antenna-space channel vector by performing an inverse spatial transformation process, which is a spatial transformation process in a direction reverse to that of the spatial transformation process performed by the spatial transformation unit 4, on the second beam-space channel vector generated by the noise suppression unit 5.

The extraction unit 7 extracts elements each of which corresponds to a respective one of the plurality of antennas as estimated values of the channel responses based on the second antenna-space channel vector calculated by the inverse spatial transformation unit 6.

As described above, the radio apparatus 1 according to the example embodiment combines padding values and performs a spatial transformation process on a vector having dimensions larger than the number of antennas when it uses a spatial transformation between an antenna space and a beam space. Consequently, the number of beams becomes larger than the number of antennas and the angular difference between the direction of the beam and the direction of the path becomes smaller, so that the channel estimation accuracy can be improved. Therefore, according to the radio apparatus 1 in accordance with the example embodiment, it is possible to improve the channel estimation accuracy when a spatial transformation between an antenna space and a beam space is used.

First Example Embodiment

Example embodiments according to the present disclosure will be described hereinafter with reference to the drawings.

Example of Configuration of Radio Communication System

Figure 2:
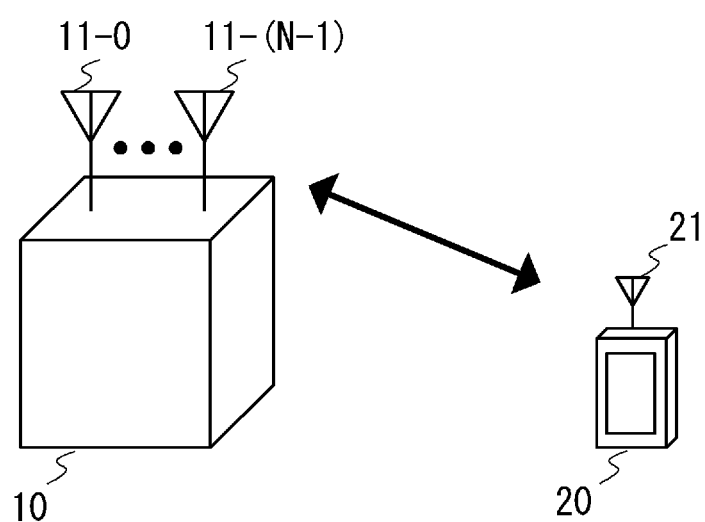
FIG. 2 is a diagram showing an example of a configuration of a radio communication system according to the first example embodiment.

Firstly, an example of a configuration of a radio communication system 100 according to a first example embodiment will be described with reference to FIG. 2. FIG. 2 shows an example of a configuration of the radio communication system according to the first example embodiment. As shown in FIG. 2, the radio communication system 100 includes a radio apparatus 10 and a radio terminal 20. Note that the following description is given on the assumption that the radio communication system 100 includes one radio terminal 20. However, needless to say, the radio communication system 100 may include a plurality of radio terminals.

The radio apparatus 10 may be, for example, a base station or an access point. The radio apparatus 10 may be an NR NodeB (NR NB) or a gNodeB (gNB). Alternatively, the radio apparatus 10 may be an eNodeB (evolved Node B or eNB).

The radio apparatus 10 includes a plurality of antennas 11-0 to 11-(N−1). N is an integer of two or larger, and the same applies to the description below. The radio apparatus 10 connects to and communicate with the radio terminal 20 through each of the plurality of antennas 11-0 to 11-(N−1). Note that in the following description, when the antennas 11-0 to 11-(N−1) are not distinguished from each other, they may be simply referred to as "antennas 11".

The radio terminal 20 may be, for example, a mobile station, a UE (User Equipment), a WTRU (Wireless Transmit/Receive Unit), or a relay apparatus having a relaying function. The radio terminal 20 includes an antenna 21. The radio terminal 20 connects to and communicates with the radio apparatus 10 through the antenna 21. Note that although the following description is given on the assumption that the radio terminal 20 includes one antenna, the radio terminal 20 may include a plurality of antennas.

Example of Configuration of Radio Apparatus

Figure 3:
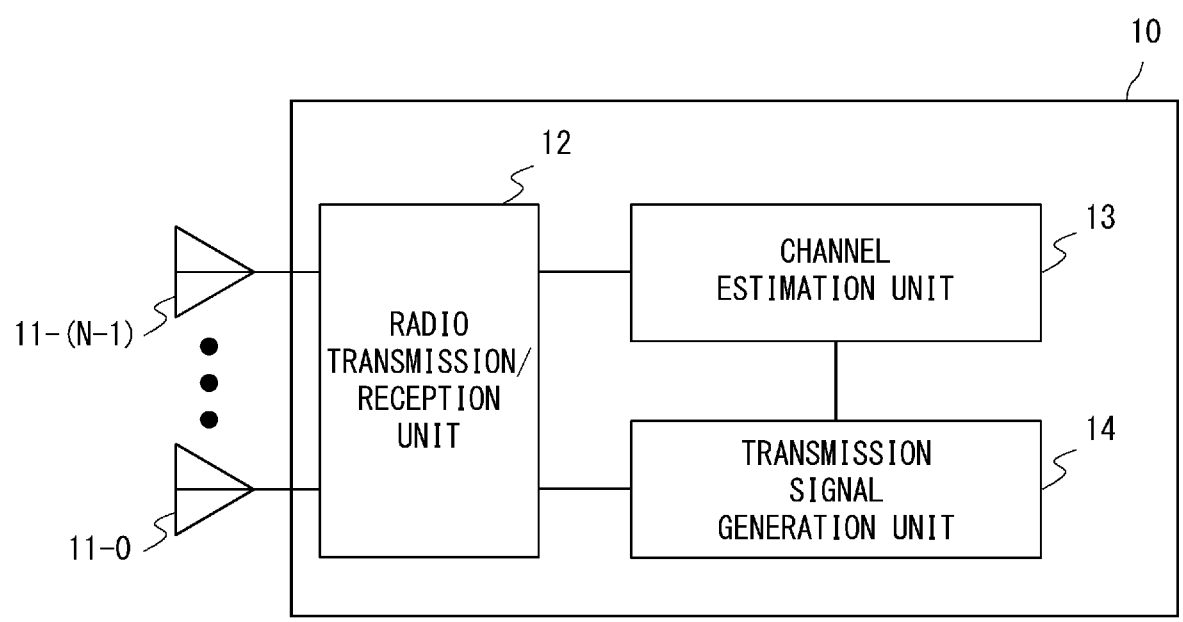
FIG. 3 shows an example of a configuration of a radio apparatus according to the first example embodiment.

Next, an example of a configuration of a radio apparatus 10 according to the first example embodiment will be described with reference to FIG. 3. FIG. 3 shows an example of a configuration of the radio apparatus according to the first example embodiment. As shown in FIG. 3, the radio apparatus 10 includes antennas 11, a radio transmission/reception unit 12, a channel estimation unit 13, and a transmission signal generation unit 14.

The antennas 11 receive a radio signal including a reference signal transmitted from the radio terminal 20 and output the received radio signal to the radio transmission/reception unit 12. Note that it is assumed that the reference signal transmitted from the radio terminal 20 is known in the radio apparatus 10. Further, the antennas 11 transmit a radio signal input from the radio transmission/reception unit 12 to the radio terminal 20.

The radio transmission/reception unit 12 converts the radio signal input from the antennas 11 into a baseband signal and outputs the obtained baseband signal to the channel estimation unit 13. Further, the radio transmission/reception unit 12 converts a baseband signal input from the transmission signal generation unit 14 (which will be described later) into a radio signal and outputs the obtained radio signal to the antennas 11.

Depending on the radio communication method used in the radio communication system 100, it may be necessary to perform processing such as the removal of CP (Cyclic Prefix) and an FFT (Fast Fourier Transform) between the radio transmission/reception unit 12 and the channel estimation unit 13. Therefore, a processing module that performs the above-described processing may be provided between the radio transmission/reception unit 12 and the channel estimation unit 13. Note that in this specification, since the above-described processing is not directly related to the present disclosure, the illustration and description of the above-described processing module are omitted.

The channel estimation unit 13 estimates a channel response between the antennas 11 of the radio apparatus 10 and the antenna 21 of the radio terminal 20 by using the signal and the reference signal input from the radio transmission/reception unit 12, and outputs an estimated value of the channel response to the transmission signal generation unit 14. The channel estimation unit 13 may estimate, as the channel response, a frequency response of the channel or an impulse response of the channel.

The transmission signal generation unit 14 performs processing such as encrypting, encoding, modulating, mapping onto radio resources, and the like for transmission data input from a core network (not shown). Then, the transmission signal generation unit 14 performs precoding on the modulation signal mapped onto radio resources by using the estimated value of the channel response input from the channel estimation unit 13, and outputs the generated signal to the radio transmission/reception unit 12.

Note that the encoding method, the modulation mode, the method for mapping onto radio resources, and the like are determined by a scheduler (not shown). The scheduler may use, in the processing to be performed, the estimated value of the channel response output from the channel estimation unit 13. Note that in this specification, since the scheduler is not directly related to the present disclosure, the description thereof is omitted.

Further, depending on the radio communication method used in the radio communication system 100, it may be necessary to perform processing such as an Inverse Fast Fourier Transform (IFFT) and the addition of CP between the transmission signal generation unit 14 and the radio transmission/reception unit 12. Therefore, a processing module that performs the above-described processing may be provided between the transmission signal generation unit 14 and the radio transmission/reception unit 12. In this specification, since the above-described processing is not directly related to the present disclosure, the illustration and description of the processing module are omitted.

Example of Configuration of Channel Estimation Unit

Figure 4:
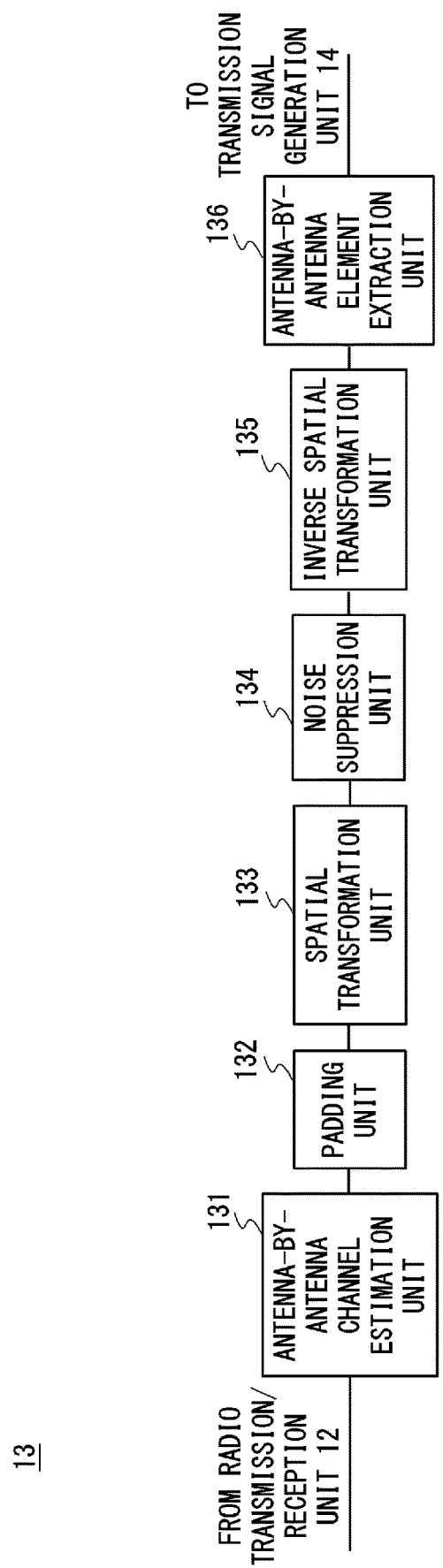
FIG. 4 shows an example of a configuration of a channel estimation unit according to the first example embodiment.

Next, an example of a configuration of the channel estimation unit 13 according to the first example embodiment will be described in detail with reference to FIG. 4. FIG. 4 shows an example of a configuration of the channel estimation unit according to the first example embodiment. The channel estimation unit 13 includes an antenna-by-antenna channel estimation unit 131, a padding unit 132, a spatial transformation unit 133, a noise suppression unit 134, an inverse spatial transformation unit 135, and an antenna-by-antenna element extraction unit 136.

The antenna-by-antenna channel estimation unit 131 corresponds to the estimation unit 2 in the outline of the example embodiment. The antenna-by-antenna channel estimation unit 131 estimates, for each of the antennas 11-0 to 11-(N−1) of the radio apparatus 10, a channel response for a channel between that antenna and the antenna 21 of the radio terminal 20 by using the signal and the reference signal input from the radio transmission/reception unit 12. Then, the antenna-by-antenna channel estimation unit 131 outputs the estimated values of the channel responses to the padding unit 132.

The padding unit 132 corresponds to the padding unit 3 in the outline of the example embodiment. The padding unit 132 generates an antenna-space channel vector having dimensions larger than the number of antennas 11 by combining the estimated values of the channel responses input from the antenna-by-antenna channel estimation unit 131 with padding values. Specifically, since the number of antennas 11 is N, the padding unit 132 generates an antenna-space channel vector having dimensions larger than N dimensions. The padding unit 132 outputs the generated antenna-space channel vector to the spatial transformation unit 133.

The spatial transformation unit 133 corresponds to the spatial transformation unit 4 in the outline of the example embodiment. The spatial transformation unit 133 calculates a beam-space channel vector by performing a spatial transformation process on the antenna-space channel vector input from the padding unit 132. Then, the spatial transformation unit 133 outputs the calculated beam-space channel vector to the noise suppression unit 134.

The noise suppression unit 134 corresponds to the noise suppression unit 5 in the outline of the example embodiment. The noise suppression unit 134 suppresses at least one element included in the beam-space channel vector input from the spatial transformation unit 133 and outputs the element-suppressed beam-space channel vector to the inverse spatial transformation unit 135.

The inverse spatial transformation unit 135 corresponds to the inverse spatial transformation unit 6 in the outline of the example embodiment. The inverse spatial transformation unit 135 calculates an antenna-space channel vector by performing an inverse spatial transformation process, which is a spatial transformation process in a direction reverse to that of the spatial transformation process performed by the spatial transformation unit 133, on the beam-space channel vector input from the noise suppression unit 134. Then, the inverse spatial transformation unit 135 outputs the calculated antenna-space channel vector to the antenna-by-antenna element extraction unit 136.

The antenna-by-antenna element extraction unit 136 corresponds to the extraction unit 7 in the outline of the example embodiment. The antenna-by-antenna element extraction unit 136 extracts elements each of which corresponds to a respective one of the antennas 11-0 to 11-(N−1) from the antenna-space channel vector input from the inverse spatial transformation unit 135. The antenna-by-antenna element extraction unit 136 outputs the extracted elements to the transmission signal generation unit 14 as estimated values of channel responses each of which corresponding to a respective one of the antennas 11-0 to 11-(N−1).

Example of Operation of Channel Estimation Unit

Figure 5:
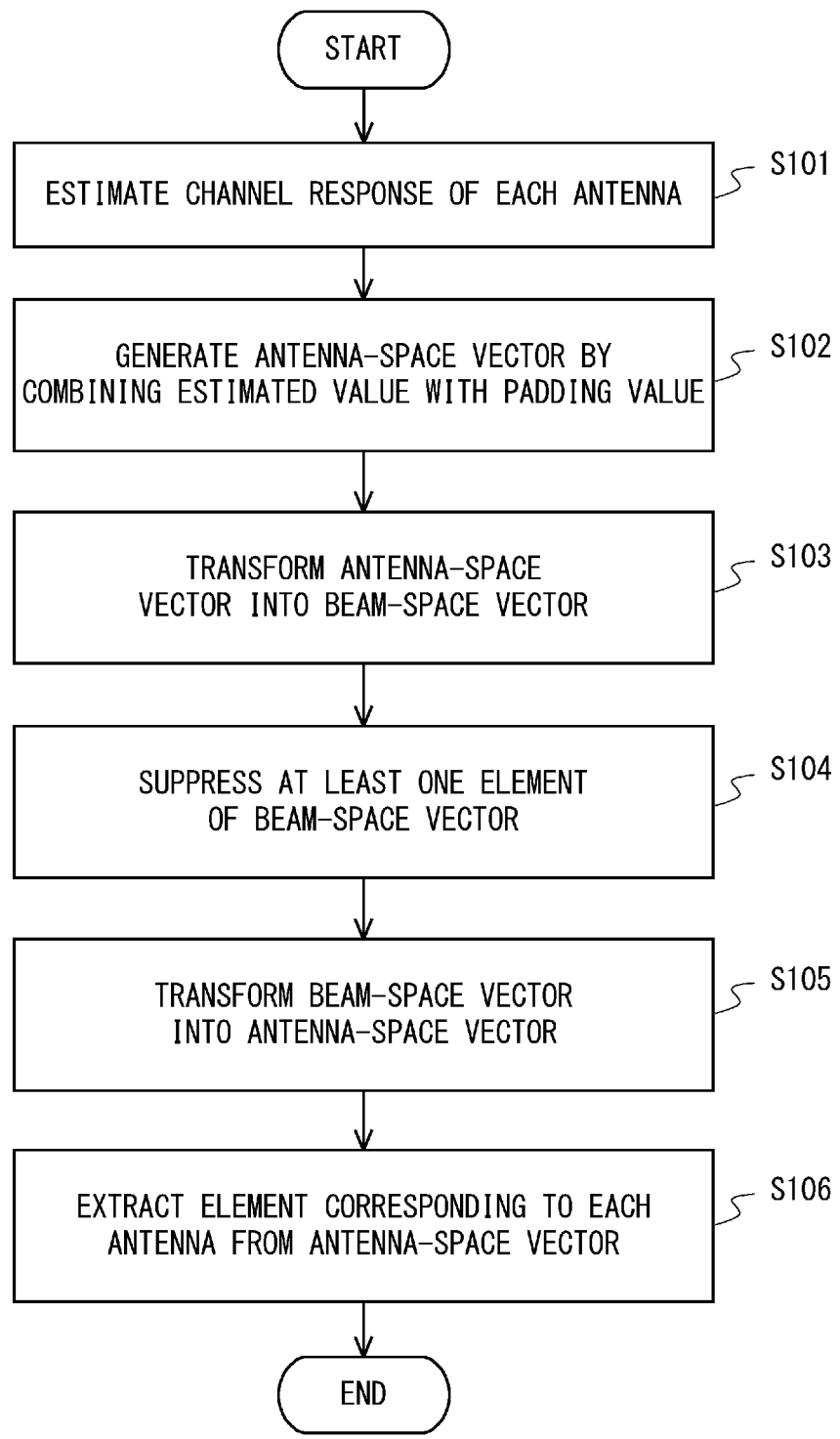
FIG. 5 is a flowchart showing an example of operations performed by the channel estimation unit according to the first example embodiment.

Next, an example of operations performed by the channel estimation unit 13 will be described with reference to FIG. 5. FIG. 5 is a flowchart showing an example of operations performed by the channel estimation unit according to the first example embodiment.

Firstly, in a step S101, the antenna-by-antenna channel estimation unit 131 estimates, for each of the antennas 11-0 to 11-(N−1), a channel response for a channel between that antenna and the antenna 21 by using the signal and the reference signal input from the radio transmission/reception unit 12.

Note that when a received signal of an n-th antenna in an i-th subcarrier input from the radio transmission/reception unit 12 is represented by $y_{i,n}$ and a reference signal in the i-th subcarrier is represented by $s_i$, an estimated value $h_{i,n}$ of a frequency response of the n-th antenna in the i-th subcarrier is calculated by the below-shown Expression (1).

[Expression 1]

$$h_{i,n} = \frac{s_i^*}{|s_i|^2} \cdot y_{i,n} \quad (1)$$

In the expression, * represents a complex conjugate.

Note that the method for calculating an estimated value of a frequency response is not limited to the above-shown Expression (1). For example, the antenna-by-antenna channel estimation unit 131 may calculate an estimated value of a frequency response by an MMSE (Minimum Mean Square Error) method.

Further, when an impulse response is estimated as the channel response, the antenna-by-antenna channel estimation unit 131 may calculate an estimated value of the impulse response by performing an inverse discrete Fourier transform on the estimated value of the frequency response. Alternatively, the antenna-by-antenna channel estimation unit 131 may estimate the impulse response by calculating a correlation between the received signal and the reference signal in the time domain.

Next, in a step S102, the padding unit 132 generates an antenna-space channel vector having dimensions larger than the number of antennas 11 by combining the estimated values of the channel responses input from the antenna-by-antenna channel estimation unit 131 with padding values. Specifically, since the number of antennas 11 is N, the padding unit 132 generates an antenna-space channel vector having dimensions larger than N dimensions.

When the estimated values of the frequency responses are input from the antenna-by-antenna channel estimation unit 131, the padding unit 132 generates an antenna-space channel vector for each subcarrier.

Further, when the estimated values of the impulse responses are input from the antenna-by-antenna channel estimation unit 131, the padding unit 132 generates an antenna-space channel vector for each tap. Note that when an estimated value of an impulse response of an n-th antenna in a d-th tap input from the antenna-by-antenna channel estimation unit 131 is represented by $h_{d,n}$ and the padding value is represented by z, an antenna-space channel vector $h_d$ having N' dimensions (N'>N) is expressed by the below-shown Expression (2).

[Expression 2]

$$h_d^T = (h_{d,0} \ldots h_{d,N-1} z \ldots z) \qquad (2)$$

In the expression, $^T$ represents a transposition.

Note that in the above-shown Expression (2), estimated values are substituted for first to N-th elements of the antenna-space channel vector, and padding values are substituted for (N+1)-th to N'-th elements. However, the method of substituting values in the antenna-space channel vector is not limited to such an example. For example, the padding unit 132 may use, as the padding value, 0 (zero), an average value of estimated values of channel responses, an estimated value of a channel response corresponding to the antenna 11-0, an estimated value of a channel response corresponding to the antennal 11-(N−1), or the like.

Next, in a step S103, the spatial transformation unit 133 calculates a beam-space channel vector by performing a spatial transformation process on the antenna-space channel vector input from the padding unit 132. The spatial transformation unit 133 may use, for example, a Discrete Fourier transform (DFT) as the spatial transformation process. Alternatively, the spatial transformation unit 133 may use a Fast Fourier Transform (FFT) instead of using the DFT. Further, in the case of using the FFT, the spatial transformation unit 133 may adjust the number of padding values combined by the padding unit 132 so that N' becomes a power of 2. That is, the spatial transformation unit 133 may adjust the number of dimensions of the antenna-space channel vector to a power of 2.

When the antennas 11 have a planar array configuration, the spatial transformation unit 133 may use a two-dimensional DFT or a two-dimensional FFT as the spatial transformation process.

Further, when the antennas 11 are composed of two orthogonal polarizations, the spatial transformation process may be independently performed for each of the polarizations. Here, an N'×N'-dimension spatial transformation matrix is represented by A. Then, when a spatial transformation process is performed for an N'-dimensional antenna-space channel vector $h_d$ for a d-th tap, an N'-dimensional beam-space channel vector $g_d$ for the d-th tap is expressed by the below-shown Expression (3).

[Expression 3]

$$g_d = A^H h_d \qquad (3)$$

In the expression, $^H$ represents a Hermitian transposition.

Next, in a step S104, the noise suppression unit 134 suppresses at least one element included in the beam-space channel vector input from the spatial transformation unit 133. The noise suppression unit 134 may select an element (s) of the beam-space channel vector of which the value(s) is lower than a predetermined threshold as the element(s) to be suppressed. Here, an estimated value of an impulse response of a b-th beam for a d-th tap, i.e., a b-th element of a beam-space channel vector $g_d$ for the d-th tap is represented by $g_{d,b}$, and a predetermined threshold is represented by $G_{th}$. In this case, when a relation $|g_{d,b}|^2 < G_{th}$ is satisfied, the noise suppression unit 134 may select the element $g_{d,b}$ as the element to be suppressed.

Note that the noise suppression unit 134 may compare a value that is obtained by averaging estimated values of impulse responses in the time direction and/or in the frequency direction with a predetermined threshold. Further, depending of the set threshold, the noise suppression unit 134 may select all the elements as the elements to be suppressed. Therefore, in order to prevent all the elements from being selected as the elements to be suppressed, the noise suppression unit 134 may perform a process for excluding at least one element from the elements to be suppressed in the step S104. The predetermined threshold may be, for example, a value proportional to the noise power in the radio apparatus 10 or a value inversely proportional to the transmission power of the reference signal. Further, for example, the noise suppression unit 134 may replace the element to be suppressed with 0 (zero), or multiply the element to be suppressed by a predetermined suppression coefficient.

Next, in a step S105, the inverse spatial transformation unit 135 calculates an antenna-space channel vector by performing an inverse spatial transformation process, which is a spatial transformation process in the direction reverse to that of the process performed by the spatial transformation unit 133, on the beam-space channel vector input from the noise suppression unit 134. When the spatial transformation unit 133 uses a discrete Fourier transform (DFT) as the spatial transformation process, the inverse spatial transformation unit 135 uses an inverse discrete Fourier transform. Alternatively, when the spatial transformation unit 133 uses a fast Fourier transform (FFT) as the spatial transformation process, the inverse spatial transform unit 135 uses an inverse fast Fourier transform (IFFT).

Note that when an N'-dimensional beam-space channel vector for a d-th tap input from the noise suppression unit 134 is represented by $g'_d$, an N'-dimensional antenna-space channel vector $h'_d$ for the d-th tap calculated by the process performed by the inverse spatial transformation unit 135 is expressed by the below-shown Expression (4).

[Expression 4]

$$h'_d = A g'_d \qquad (4)$$

Next, in a step S106, the antenna-by-antenna element extraction unit 136 extracts elements each of which corresponds to a respective one of the antennas 11-0 to 11-(N−1) from the antenna-space channel vector input from the inverse spatial transformation unit 135. Then, the antenna-by-antenna element extraction unit 136 uses the extracted elements as estimated values of channel responses each of which corresponds to a respective one of the antennas 11-0 to 11-(N−1).

Note that when the extracted estimated values of the channel responses are estimated values of impulse responses, the antenna-by-antenna element extraction unit 136 may transform the extracted estimated values of the channel responses into frequency responses. Alternatively, when the extracted estimated values of the channel responses are estimated values of frequency responses, the antenna-by-antenna element extraction unit 136 may transform the extracted estimated values of the channel responses into impulse responses.

The method for extracting elements performed by the antenna-by-antenna element extraction unit 136 depends on the method for generating an antenna-space channel vector performed by the padding unit 132. For example, it is assumed that estimated values of channel responses corresponding to the antennas 11-0 to 11-(N−1) are substituted for first to N-th elements of the antenna-space channel vector as in the case of the above-shown Expression (2). In this case, the antenna-by-antenna element extraction unit 136 may extract the first to N-th elements of the antenna-space channel vector input from the inverse spatial transformation unit 135, and use the extracted elements as estimated values of the channel responses corresponding to the antennas 11-0 to 11-(N−1).

As described above-described, the radio apparatus 10 according to the first example embodiment combines padding values and performs a spatial transformation process on a vector having dimensions larger than the number of antennas when it uses a spatial transformation between an antenna space and a beam space. Therefore, since the number of beams becomes larger than the number of antennas, the angular difference between the direction of the beam and the direction of the path becomes smaller. Accordingly, it is possible to improve the channel estimation accuracy by using the radio apparatus 10 according to the first example embodiment.

Second Example Embodiment

Next, a second example embodiment will be described in detail with reference to the drawings. The second example embodiment is a modified example of the first example embodiment. In the second example embodiment, a radio apparatus 10 has a tap selecting function and estimates channels by performing a spatial transformation process only on selected taps.

The fundamental configuration of a radio communication system 100 according to the second example embodiment is similar to that of the first example embodiment. Further, in the radio apparatus 10 according to the second example embodiment, the channel estimation unit 13 of the radio apparatus 10 according to the first example embodiment is replaced by a channel estimation unit 15. The configurations of the radio communication system 100 and the radio apparatus 10 according to the second example embodiment are similar to those shown in FIGS. 2 and 3, and therefore the descriptions thereof are omitted. In the following description, an example of a configuration of and an example of operations performed by the channel estimation unit 15 of the radio apparatus 10 according to the second example embodiment will be described.

Example of Configuration of Channel Estimation Unit

Figure 6:
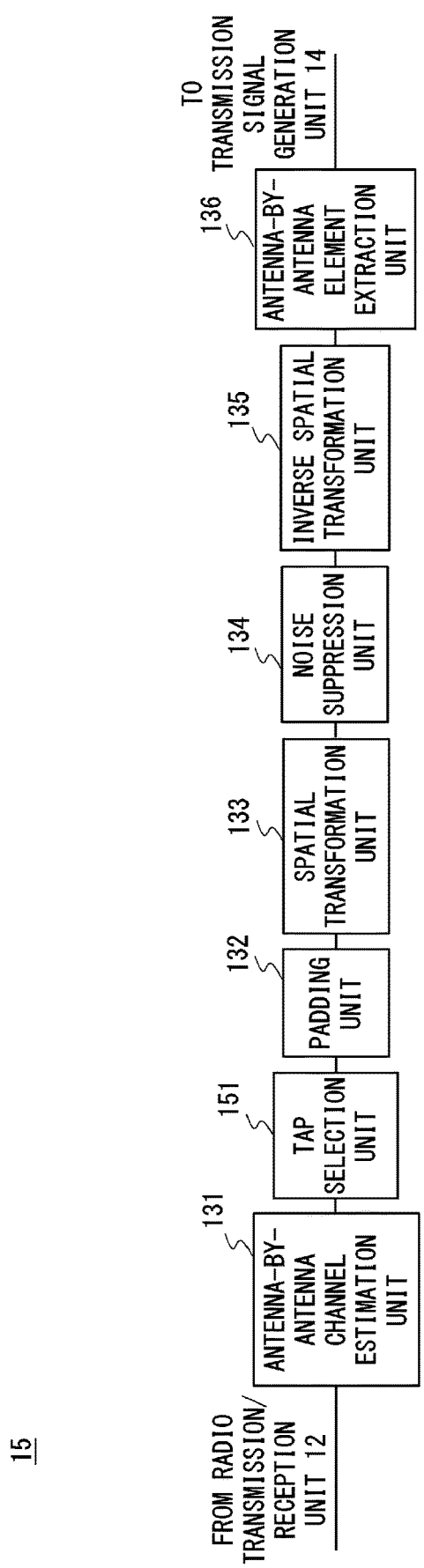
FIG. 6 shows an example of a configuration of a channel estimation unit according to a second example embodiment.

An example of a configuration of the channel estimation unit 15 according to the second example embodiment will be described with reference to FIG. 6. FIG. 6 shows an example of a configuration of the channel estimation unit according to the second example embodiment. As shown in FIG. 6, the channel estimation unit 15 is different from the channel estimation unit 13 according to the first example embodiment shown in FIG. 4 because the channel estimation unit 15 includes a tap selection unit 151.

The antenna-by-antenna channel estimation unit 131 estimates, for each of the antennas 11-0 to 11-(N−1) of the radio apparatus 10, an impulse response between that antenna and the antenna 21 of the radio terminal 20 as a channel response, and outputs the estimated values of the impulse responses to the tap selection unit 151.

The tap selection unit 151 selects taps that should be processed by the padding unit 132 by using the estimated values of the impulse responses input from the antenna-by-antenna channel estimation unit 131. Then, the tap selection unit 151 outputs the estimated values of the impulse responses for the selected taps to the padding unit 132.

Note that the tap selection unit 151 may output the estimated values of the impulse responses for all the taps and the tap numbers of the selected taps. Alternatively, the tap selection unit 151 may replace the estimated values of the impulse responses for taps that have not been selected by zero and then output the estimated values of the impulse responses for all the taps.

The padding unit 132, the spatial transformation unit 133, the noise suppression unit 134, the inverse spatial transformation unit 135, and the antenna-by-antenna element extraction unit 136 are similar to those in the first example embodiment except that only the taps selected by the tap selection unit 151 are processed by them. Therefore, their descriptions are omitted.

Example of Operation Performed by Channel Estimation Unit

Figure 7:
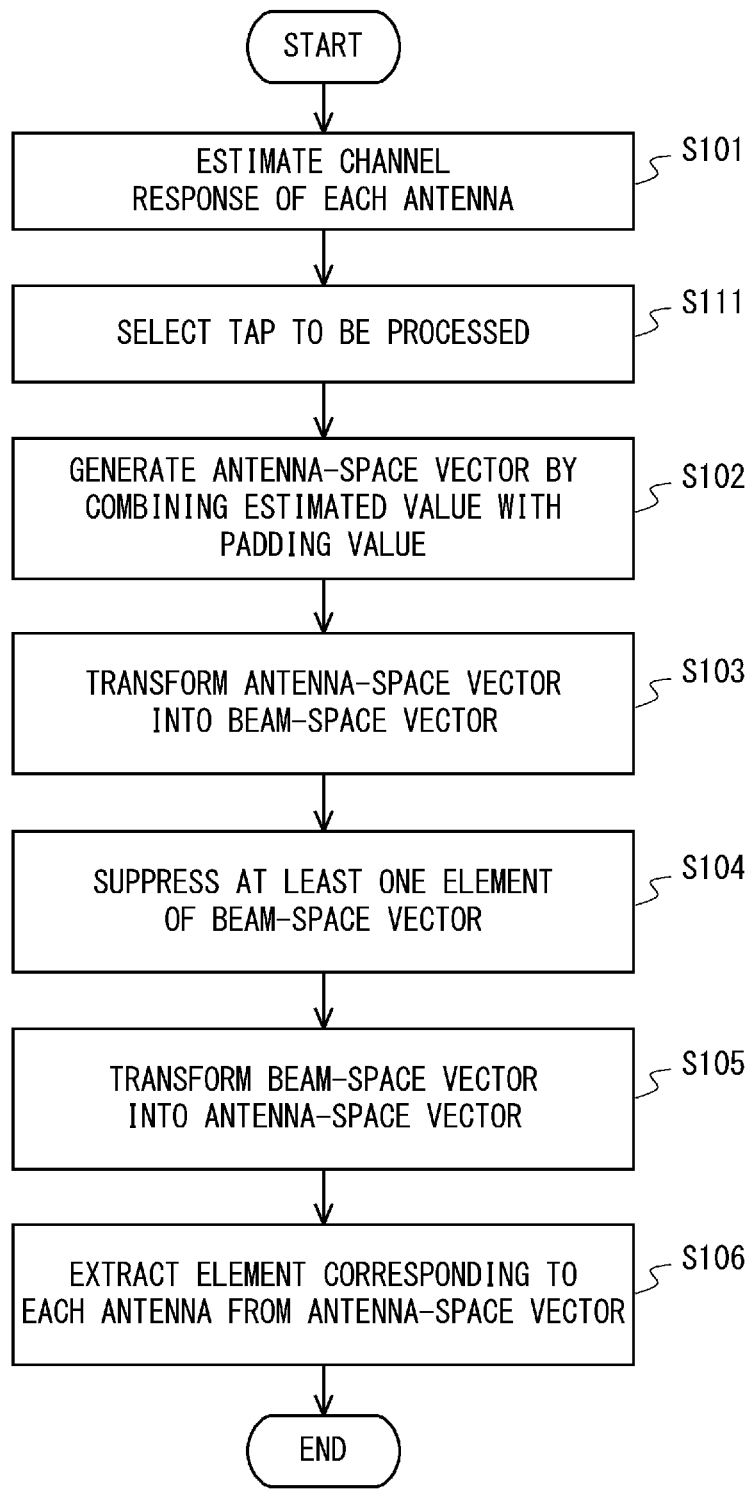
FIG. 7 is a flowchart showing an example of operations performed by the channel estimation unit according to the second example embodiment.

Next, an example of operations performed by the channel estimation unit 15 will be described with reference to FIG. 7. FIG. 7 is a flowchart showing an example of operations performed by the channel estimation unit according to the second example embodiment. The example of operations shown in FIG. 7 differs from those performed by the channel estimation unit 13 described in the first example embodiment shown in FIG. 4 because a step S111 is added therein. Note that the rest of the operations shown in FIG. 7 are similar to those shown in FIG. 4, and therefore the descriptions thereof are omitted as appropriate.

Firstly, in a step S101, the antenna-by-antenna channel estimation unit 131 estimates, for each of the antennas 11-0 to 11-(N−1) of the radio apparatus 10, an impulse response between that antenna and the antenna 21 of the radio terminal 20 as a channel response. Since the method of estimating an impulse response is similar to that in the first example embodiment, the description thereof is omitted.

Next, in a step S111, the tap selection unit 151 selects taps by using the estimated values of the impulse responses input from the antenna-by-antenna channel estimation unit 131. In other words, the tap selection unit 151 selects taps that should be processed by the padding unit 132 by using the estimated values of the impulse responses. Note that details of the process performed in the step S111 will be described later.

Next, the channel estimation unit 15 performs processes in steps S102 to S106. Note that the processes in the steps S102 to S106 are similar to those in the first example embodiment except that only the taps selected in the step S111 are processed. Therefore, their descriptions are omitted.

Details of Example of Operation in Step S111

Next, a method for selecting taps performed in the step S111 in FIG. 7 will be described. The tap selection unit 151 selects taps by using the estimated values of the impulse responses input from the antenna-by-antenna channel estimation unit 131.

The tap selection unit 151 may select taps within a predetermined range. When the number of taps for the impulse responses is represented by D and the tap numbers for the impulse responses are represented by 0 to D, the tap selection unit 151 may select taps having tap numbers 0 to $(D_+ -1)$ and those having tap numbers $(D-D_-)$ to $(D-1)$. Note that $D_+$ and $D_-$ are parameters for determining the range of taps to be selected. The values of $D_+$ and $D_-$ are set according to the delay spread of the channel, the processing load, and the like. For example, when the delay spread is large, $D_+$ may have a larger value. In this way, it is possible to select taps while taking paths having large delays into consideration.

Further, the tap selection unit 151 may select taps for which an average value of the squares of the impulse responses is larger than a predetermined threshold. Note that the average value $\xi_d$ of the squares of the impulse responses of a d-th tap is calculated by the below-shown Expression (5).

[Expression 5]

$$\xi_d = \frac{1}{N}\sum_{n=0}^{N-1} |h_{d,n}|^2 \quad (5)$$

Note that in the Expression (5), the tap selection unit 151 sets the range of impulse responses of which the average value of the squares is calculated to the antennas 11-0 to 11-(N−1). However, the number of antennas for which the average value is calculated may be any number equal to or larger than one. Further, depending on the setting of the threshold, none of the taps may be selected. Therefore, the tap selection unit 151 may be configured so as to select at least one tap.

The threshold may be either a value proportional to the noise power in the radio apparatus 10 or a value inversely proportional to the transmission power of the reference signal. Alternatively, the threshold may be obtained as follows: an average value of the squares of impulse responses for taps in a predetermined range in which the path components seem to be negligibly small is calculated; the calculated average value is regarded as a variance of errors of the estimated values; and a value proportional to the variance of the errors of the estimated values is used as the threshold. In this case, the variance $\sigma^2$ of the errors of the estimated values is calculated by, for example, the below-shown Expression (6).

[Expression 6]

$$\sigma^2 = \frac{1}{(D - D_+ - D_-) \cdot N} \sum_{d=D_+}^{D-D_--1} \sum_{n=0}^{N-1} |h_{d,n}|^2 \quad (6)$$

Note that the range for the averaging used in the above-shown Expression (6) is merely an example. That is, the range for the averaging may be narrowed from this range.

As described above-described, the radio apparatus 10 according to the second example embodiment has a configuration similar to that in the first example embodiment. That is, similarly to the first example embodiment, the radio apparatus 10 according to the second example embodiment combines padding values and performs a spatial transformation process on a vector having dimensions larger than the number of antennas when it uses a spatial transformation between an antenna space and a beam space. Therefore, by using the radio apparatus 10 according to the second example embodiment, the number of beams becomes larger than the number of antennas and the angular difference between the direction of the beam and the direction of the path becomes smaller, so that the channel estimation accuracy can be improved.

Further, the radio apparatus 10 according to the second example embodiment includes the tap selection unit 151 in addition to the configuration of the radio apparatus 10 according to the first example embodiment. The radio apparatus 10 according to the second example embodiment performs channel estimation by performing a spatial transformation process only for taps selected by the tap selection unit 151. Therefore, by using the radio apparatus 10 according to the second example embodiment, the amount of calculation can be reduced as compared to that in the first example embodiment.

Third Example Embodiment

Next, a third example embodiment will be described in detail with reference to the drawings. The third example embodiment is a modified example of the first and second example embodiments. Therefore, the third example embodiment will be described with reference to the first example embodiment. In the third example embodiment, a radio apparatus 10 includes a window-function multiplying function and a window-function dividing function, and performs a multiplication by a window function before a spatial transformation and performs a division by the window function after an inverse spatial transformation.

The fundamental configuration of a radio communication system 100 according to the third example embodiment is similar to that of the first example embodiment. Further, in the radio apparatus 10 according to the third example embodiment, the channel estimation unit 13 of the radio apparatus 10 according to the first example embodiment is replaced by a channel estimation unit 16. The configurations of the radio communication system 100 and the radio apparatus 10 according to the third example embodiment are similar to those shown in FIGS. 2 and 3, and therefore the descriptions thereof are omitted. In the following description, an example of a configuration of and an example of operations performed by the channel estimation unit 16 of the radio apparatus 10 according to the third example embodiment will be described.

Example of Configuration of Channel Estimation Unit

Figure 8:
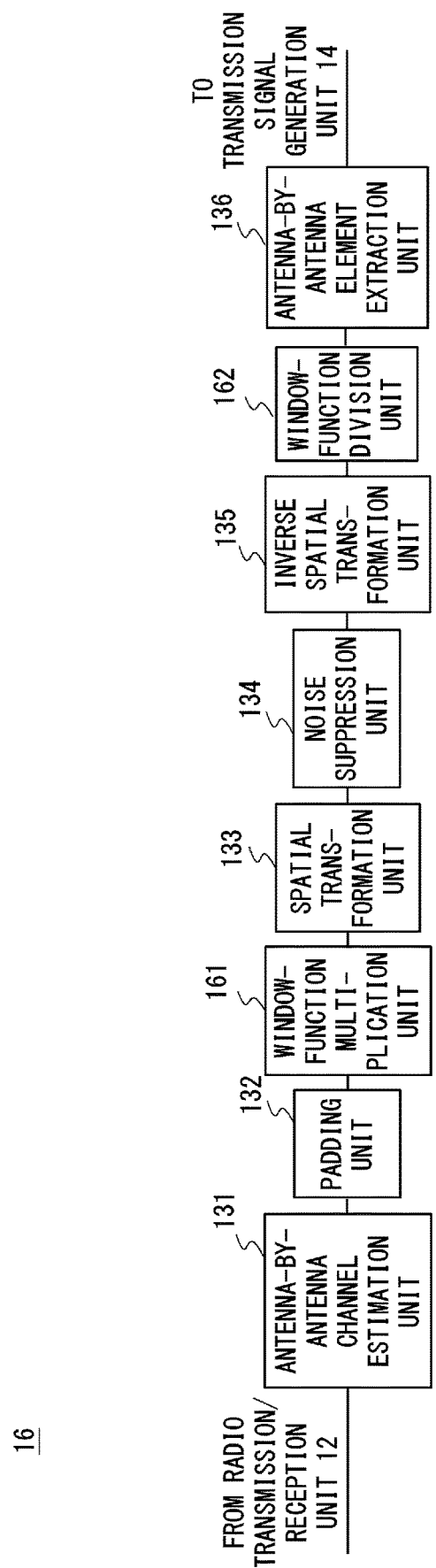
FIG. 8 shows an example of a configuration of a channel estimation unit according to a third example embodiment.

An example of a configuration of the channel estimation unit 16 according to the third example embodiment will be described with reference to FIG. 8. FIG. 8 shows an example of a configuration of the channel estimation unit according to the third example embodiment. As shown in FIG. 8, the channel estimation unit 16 is different from the channel estimation unit 13 according to the first example embodiment shown in FIG. 4 because the channel estimation unit 16 includes a window-function multiplication unit 161 and a window-function division unit 162.

In FIG. 8, the window-function multiplication unit 161 is disposed between the padding unit 132 and the spatial transformation unit 133. However, the order of the padding unit 132 and the window-function multiplication unit 161 may be reversed. That is, the window-function multiplication unit 161 may be disposed next to the antenna-by-antenna channel estimation unit 131, and the padding unit 132 may be disposed next to the window-function multiplication unit 161.

Further, in FIG. 8, the window-function division unit 162 is disposed between the inverse spatial transformation unit 135 and the antenna-by-antenna element extraction unit 136, but the order of the inverse spatial transformation unit 135 and the window-function division unit 162 may be reversed. That is, the antenna-by-antenna element extraction unit 136 may be disposed next to the inverse spatial transformation unit 135, and the window-function division unit 162 may be disposed next to the antenna-by-antenna element extraction unit 136.

The padding unit 132 outputs the generated antenna-space channel vector to the window-function multiplication unit 161.

The window-function multiplication unit 161 multiplies the antenna-space channel vector input from the padding unit 132 by a window function and outputs the antenna-space channel vector, which has been multiplied by the window function, to the spatial transformation unit 133.

The spatial transformation unit 133 performs a spatial transformation process on the antenna-space channel vector input from the window-function multiplication unit 161, and outputs the calculated beam-space channel vector to the noise suppression unit 134.

The inverse spatial transformation unit 135 outputs the calculated antenna-space channel vector to the window-function division unit 162.

The window-function division unit 162 divides the antenna-space channel vector input from the inverse spatial transformation unit 135 by the same window function by which the antenna-space channel vector has been multiplied by the window-function multiplication unit 161, and outputs the antenna-space channel vector, which has been divided by the window function, to the antenna-by-antenna element extraction unit 136.

The antenna-by-antenna element extraction unit 136 extracts elements each of which corresponds to a respective one of the antennas 11-0 to 11-(N−1) from the antenna-space channel vector input from the window-function division unit 162. The antenna-by-antenna element extraction unit 136 outputs the extracted elements to the transmission signal generation unit 14 as the estimated values of the channel responses each of which corresponding to a respective one of the antennas 11-0 to 11-(N−1).

Since the antenna-by-antenna channel estimation unit 131 and the noise suppression unit 134 are similar to those in the first example embodiment, descriptions thereof are omitted.

Example of Operation Performed by Channel Estimation Unit

Figure 9:
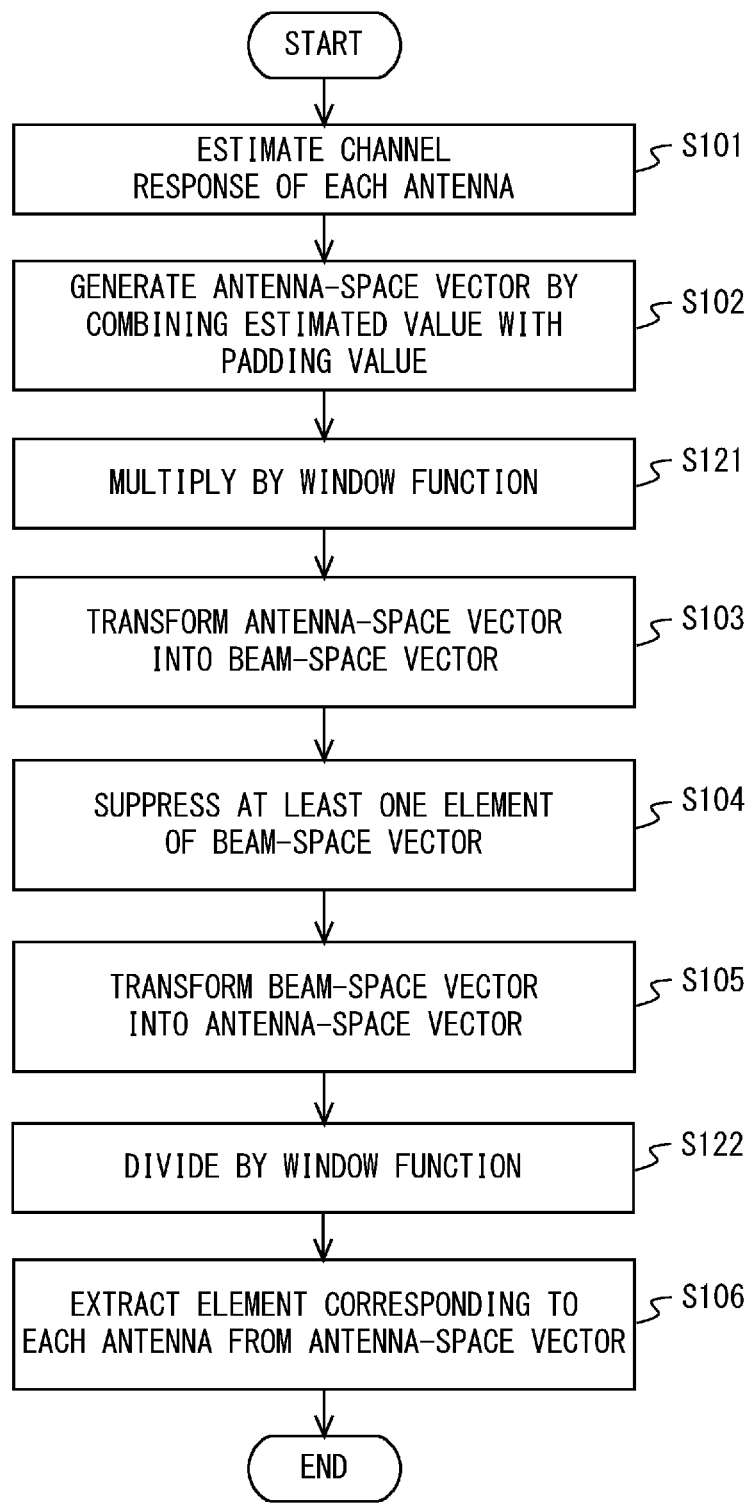
FIG. 9 is a flowchart showing an example of operations performed by the channel estimation unit according to the third example embodiment.

Next, an example of operations performed by the channel estimation unit 16 will be described with reference to FIG. 9. FIG. 9 is a flowchart showing an example of operations performed by the channel estimation unit according to the third example embodiment. The example of operations shown in FIG. 9 differs from those performed by the channel estimation unit 13 described in the first example embodiment shown in FIG. 4 because steps S161 and S162 are added therein. Note that the rest of the operations shown in FIG. 9 are similar to those shown in FIG. 4, and therefore the description thereof will be omitted as appropriate.

In the step S161, the window-function multiplication unit 161 multiplies the antenna-space channel vector input from the padding unit 132 by a window function. The window-function multiplication unit 161 may use, for example, a triangular window, a Hanning window, a Hamming window, a Blackman window, or the like as the window function. Since the degree of the dispersion of components of a path into a beam changes depending on the applied window function, the window-function multiplication unit 161 may select an appropriate window function according to the desired characteristic. The size of the window function may be N', which is equal to the size of the antenna-space channel vector, or may be N, which is equal to the number of antennas 11.

In the step S162, the window-function division unit 162 divides the antenna-space channel vector input from the inverse spatial transformation unit 135 by the same window function by which the antenna-space channel vector has been multiplied by the window-function multiplication unit 161. Note that the window-function division unit 162 may use a method for multiplying the channel vector by the reciprocal of the window function.

Since processes in steps S101 to S106 are similar to those in the first example embodiment, the descriptions thereof are omitted.

As described above-described, the radio apparatus 10 according to the third example embodiment has a configuration similar to that in the first or second example embodiment. That is, similarly to the first and second example embodiments, the radio apparatus 10 according to the third example embodiment combines padding values and performs a spatial transformation process on a vector having dimensions larger than the number of antennas when it uses a spatial transformation between an antenna space and a beam space. Therefore, by using the radio apparatus 10 according to the third example embodiment, the number of beams becomes larger than the number of antennas and the angular difference between the direction of the beam and the direction of the path becomes smaller, so that the channel estimation accuracy can be improved.

Further, the radio apparatus 10 according to the third example embodiment includes the window-function multiplication unit 161 and the window-function division unit 162 in addition to the configuration of the radio apparatus 10 according to the first or second example embodiment. Therefore, since the radio apparatus 10 according to the third example embodiment multiplies the channel vector by a window function before the spatial transformation from an antenna space to a beam space, the number of beams having the components of the path can be reduced and the number of beams in which the noise components is dominant can be increased. Therefore, by using the radio apparatus 10 according to the third example embodiment, the channel estimation accuracy can be further improved as compared to the first and second example embodiments.

Other Example Embodiment

<1> The above-described first to third example embodiments have been explained by using examples in which the radio apparatus 10 estimates channel responses between the radio apparatus 10 and the radio terminal 20, and transmits a signal to the radio terminal 20 by using a result of the estimation. However, the present disclosure is not limited to such examples. That is, the present disclosure may be applied to a receiving process in which a signal transmitted from the radio terminal 20 is received by using a result of estimation of channel responses estimated by the radio apparatus 10.

Figure 10:
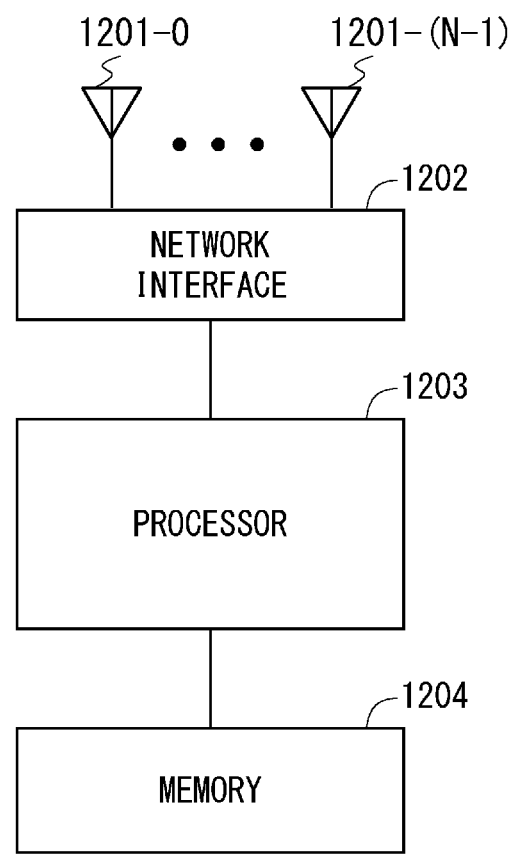
FIG. 10 is a block diagram for showing an example of a hardware configuration of a computer (information processor) capable of implementing a radio apparatus according to each example embodiment of the present disclosure.

<2> The radio apparatus 1 and the radio apparatus 10 (hereinafter referred to as the radio apparatus 1 and the like) according to the above-described example embodiment may have a hardware configuration described below. FIG. 10 is a block diagram showing an example of a hardware configuration of a computer (an information processing apparatus) capable of implementing a radio apparatus according to each example embodiment of the present disclosure.

As shown in FIG. 10, a radio apparatus 1 or the like includes a plurality of antennas 1201-0 to 1201-(N−1), a network interface 1202, a processor 1203, and a memory 1204. The plurality of antennas 1201-0 to 1201-(N−1) and the network interface 1202 are used to communicate with other radio communication apparatuses including a radio terminal 20. The network interface 1202 may include, for example, a network interface card (NIC) in conformity with IEEE 802.11 series, IEEE 802.3 series, or the like.

The processor 1203 may load software (a computer program) from the memory 1204 and execute the loaded software, thereby performing the processes of the radio apparatus 1 or the like described by using the flowchart in the above-described embodiments. The processor 1203 may be, for example, a microprocessor, an MPU (Micro Processing Unit), or a CPU (Central Processing Unit). The processor 1203 may include a plurality of processors.

The memory 1204 is formed by a combination of a volatile memory and a nonvolatile memory. The memory 1204 may include a storage located remotely from the processor 1203. In this case, the processor 1203 may access the memory 1204 through an I/O interface (not shown).

In the example shown in FIG. 10, the memory 1204 is used to store a group of software modules. The processor 1203 may load the group of software modules from the memory 1204 and execute the loaded software module, thereby performing the processes of the radio apparatus 1 or the like described in the above-described embodiments.

As described above with reference to FIG. 10, each of the processors included in the radio apparatus 1 or the like executes one or a plurality of programs including a group of instructions for causing a computer to perform the algorithm described above with reference to the drawings.

In the above-described examples, the program may be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W. Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory). These programs may be supplied to the computer by using various types of transitory computer readable media. Examples of the transitory computer readable media include an electrical signal, an optical signal, and an electromagnetic wave. The transitory computer readable media can be used to supply programs to the computer through a wired communication line (e.g., electric wires and optical fibers) or a wireless communication line.

Although the present invention is explained above with reference to example embodiments, the present invention is not limited to the above-described example embodiments. Various modifications that can be understood by those skilled in the art can be made to the configuration and details of the present invention within the scope of the invention. Further, the present disclosure may be implemented by combining the example embodiments with one another as desired.

Further, the whole or part of the embodiments disclosed above can be described as, but not limited to, the following supplementary notes.

Supplementary Note 1

A radio apparatus comprising:
an estimation unit configured to calculate an estimated value of a channel response for each of a plurality of antennas;
a padding unit configured to generate a first antenna-space channel vector having dimensions larger than the number of the plurality of antennas by combining the estimated value with a padding value;
a spatial transformation unit configured to calculate a first beam-space channel vector by performing a spatial transformation process on the first antenna-space channel vector;
a noise suppression unit configured to generate a second beam-space channel vector by suppressing at least one element included in the first beam-space channel vector;
an inverse spatial transformation unit configured to calculate a second antenna-space channel vector by performing an inverse spatial transformation process on the second beam-space channel vector, the inverse spatial transformation process being a spatial transformation process in a direction reverse to that of the spatial transformation process; and
an extraction unit configured to extract elements each of which corresponds to a respective one of the plurality of antennas as estimated values of the channel responses based on the second antenna-space channel vector.

Supplementary Note 2

The radio apparatus described in Supplementary note 1, wherein
the spatial transformation unit performs the spatial transformation process by using a discrete Fourier transform or a fast Fourier transform, and
the inverse spatial transformation unit performs the inverse spatial transformation process by using one of an inverse discrete Fourier transform and an inverse fast Fourier transform that corresponds to the spatial transformation process.

Supplementary Note 3

The radio apparatus described in Supplementary note 2, wherein the padding unit sets the number of dimensions of the first antenna-space channel vector to a power of 2.

Supplementary Note 4

The radio apparatus described in any one of Supplementary notes 1 to 3, wherein
each of the plurality of antennas is composed of two orthogonal polarizations, and
the spatial transformation unit performs the spatial transformation process for the two orthogonal polarizations independently of each other.

Supplementary Note 5

The radio apparatus described in any one of Supplementary notes 1 to 4, wherein the noise suppression unit generates the second beam-space channel vector by comparing a magnitude of each element included in the first beam-space channel vector with a noise suppression threshold and replacing an element of which the magnitude is lower than the noise suppression threshold by zero.

Supplementary Note 6

The radio apparatus described in any one of Supplementary notes 1 to 5, wherein the padding unit uses zero as the padding value.

Supplementary Note 7

The radio apparatus described in any one of Supplementary notes 1 to 6, further comprising a tap selection unit configured to select a tap to be processed by the padding unit, wherein
the estimation unit calculates an estimated value of an impulse response as the estimated value of the channel response, and
the tap selection unit selects the tap by using the estimated value of the impulse response.

Supplementary Note 8

The radio apparatus described in Supplementary note 7, wherein the tap selection unit selects a tap within a predetermined range.

Supplementary Note 9

The radio apparatus described in Supplementary note 7 or 8, wherein the tap selection unit compares the estimated value of the impulse response with a tap selecting threshold, and selects a tap of which the estimated value of the impulse response is larger than the tap selecting threshold.

Supplementary Note 10

The radio apparatus described in any one of Supplementary notes 1 to 9, further comprising:
a window-function multiplication unit configured to multiply the first antenna-space channel vector by a window function; and
a window-function division unit configured to divide the second antenna-space channel vector by the window function, wherein
the spatial transformation unit performs the spatial transformation process on the first antenna-space channel vector that has been multiplied by the window function, and
the extraction unit extracts elements each of which corresponds to a respective one of the plurality of antennas as estimated values of the channel responses based on the second antenna-space channel vector that has been divided by the window function.

Supplementary Note 11

The radio apparatus described in Supplementary note 10, wherein the window function is one of a triangular window, a Hanning window, a Hamming window, and a Blackman window.

Supplementary Note 12

The radio apparatus described in Supplementary note 10 or 11, wherein a size of the window function is equal to either a size of the first antenna-space channel vector or the number of the plurality of antennas.

Supplementary Note 13

A channel estimation method comprising:
calculating an estimated value of a channel response for each of a plurality of antennas;
generating a first antenna-space channel vector having dimensions larger than the number of the plurality of antennas by combining the estimated value with a padding value;
calculating a first beam-space channel vector by performing a spatial transformation process on the first antenna-space channel vector;
generating a second beam-space channel vector by suppressing at least one element included in the first beam-space channel vector;
calculating a second antenna-space channel vector by performing an inverse spatial transformation process on the second beam-space channel vector, the inverse spatial transformation process being a spatial transformation process in a direction reverse to that of the spatial transformation process; and
extracting elements each of which corresponds to a respective one of the plurality of antennas as estimated values of the channel responses based on the second antenna-space channel vector.

Supplementary Note 14

A channel estimation program for causing a computer to perform:
calculating an estimated value of a channel response for each of a plurality of antennas;
generating a first antenna-space channel vector having dimensions larger than the number of the plurality of antennas by combining the estimated value with a padding value;
calculating a first beam-space channel vector by performing a spatial transformation process on the first antenna-space channel vector;
generating a second beam-space channel vector by suppressing at least one element included in the first beam-space channel vector;
calculating a second antenna-space channel vector by performing an inverse spatial transformation process on the second beam-space channel vector, the inverse spatial transformation process being a spatial transformation process in a direction reverse to that of the spatial transformation process; and
extracting elements each of which corresponds to a respective one of the plurality of antennas as estimated values of the channel responses based on the second antenna-space channel vector.

Supplementary Note 15

A radio communication system comprising a radio terminal, and a radio apparatus configured to communicate with the radio terminal, wherein
the radio apparatus comprises:
an estimation unit configured to calculate an estimated value of a channel response for each of a plurality of antennas;
a padding unit configured to generate a first antenna-space channel vector having dimensions larger than the number of the plurality of antennas by combining the estimated value with a padding value;

a spatial transformation unit configured to calculate a first beam-space channel vector by performing a spatial transformation process on the first antenna-space channel vector;

a noise suppression unit configured to generate a second beam-space channel vector by suppressing at least one element included in the first beam-space channel vector;

an inverse spatial transformation unit configured to calculate a second antenna-space channel vector by performing an inverse spatial transformation process on the second beam-space channel vector, the inverse spatial transformation process being a spatial transformation process in a direction reverse to that of the spatial transformation process; and an extraction unit configured to extract elements each of which corresponds to a respective one of the plurality of antennas as estimated values of the channel responses based on the second antenna-space channel vector.

Supplementary Note 16

The radio communication system described in Supplementary note 15, wherein the spatial transformation unit performs the spatial transformation process by using a discrete Fourier transform or a fast Fourier transform, and the inverse spatial transformation unit performs the inverse spatial transformation process by using one of an inverse discrete Fourier transform and an inverse fast Fourier transform that corresponds to the spatial transformation process.

REFERENCE SIGNS LIST 1, 10 RADIO APPARATUS
2 ESTIMATION UNIT
3, 132 PADDING UNIT
4, 133 SPATIAL CONVERSION UNIT
5, 134 NOISE SUPPRESSION UNIT
6, 135 INVERSE SPATIAL CONVERSION UNIT
7 EXTRACTION UNIT
11, 11-0 TO 11-(N−1), 21 ANTENNA
12 RADIO TRANSMISSION/RECEPTION UNIT
13, 15, 16 CHANNEL ESTIMATION UNIT
14 TRANSMISSION SIGNAL GENERATING SECTION
20 RADIO TERMINAL
100 RADIO COMMUNICATION SYSTEM
131 ANTENNA-BY-ANTENNA CHANNEL ESTIMATION UNIT
136 ANTENNA-BY-ANTENNA ELEMENT EXTRACTION UNIT
151 TAP SELECTION UNIT
161 WINDOW-FUNCTION MULTIPLICATION UNIT
162 WINDOW-FUNCTION DIVISION UNIT

The invention claimed is:

1. A radio apparatus comprising:
at least one memory storing instructions; and
at least one processor configured to execute the instructions to:
calculate an estimated value of a channel response for each of a plurality of antennas;
generate a first antenna-space channel vector having dimensions larger than the number of the plurality of antennas by combining the estimated value with a padding value;
calculate a first beam-space channel vector by performing a spatial transformation process on the first antenna-space channel vector;
generate a second beam-space channel vector by suppressing at least one element included in the first beam-space channel vector;
calculate a second antenna-space channel vector by performing an inverse spatial transformation process on the second beam-space channel vector, the inverse spatial transformation process being a spatial transformation process in a direction reverse to that of the spatial transformation process; and
extract elements each of which corresponds to a respective one of the plurality of antennas as estimated values of the channel responses based on the second antenna-space channel vector.

2. The radio apparatus according to claim 1, wherein the at least one processor is further configured to execute the instructions to:
perform the spatial transformation process by using a discrete Fourier transform or a fast Fourier transform, and
perform the inverse spatial transformation process by using one of an inverse discrete Fourier transform and an inverse fast Fourier transform that corresponds to the spatial transformation process.

3. The radio apparatus according to claim 2, wherein the at least one processor is further configured to execute the instructions to set the number of dimensions of the first antenna-space channel vector to a power of 2.

4. The radio apparatus according to claim 1, wherein
a polarization of each of the plurality of antennas is either of two orthogonal polarizations, and
the at least one processor is further configured to execute the instructions to perform the spatial transformation process for the two orthogonal polarizations independently of each other.

5. The radio apparatus according to claim 1, wherein the at least one processor is further configured to execute the instructions to generate the second beam-space channel vector by comparing a magnitude of each element included in the first beam-space channel vector with a noise suppression threshold and replacing an element of which the magnitude is lower than the noise suppression threshold by zero.

6. The radio apparatus according to claim 1, wherein the at least one processor is further configured to execute the instructions to use zero as the padding value.

7. The radio apparatus according to claim 1, wherein the at least one processor is further configured to execute the instructions to:
calculate an estimated value of an impulse response as the estimated value of the channel response, and
select a tap to be processed by using the estimated value of the impulse response.

8. The radio apparatus according to claim 7, wherein the at least one processor is further configured to execute the instructions to select a tap within a predetermined range.

9. The radio apparatus according to claim 7, wherein the at least one processor is further configured to execute the instructions to compare the estimated value of the impulse response with a tap selecting threshold, and select a tap of which the estimated value of the impulse response is larger than the tap selecting threshold.

10. The radio apparatus according to claim 1, wherein the at least one processor is further configured to execute the instructions to:
  multiply the first antenna-space channel vector by a window function; and
  perform the spatial transformation process on the first antenna-space channel vector that has been multiplied by the window function,
  divide the second antenna-space channel vector by the window function, and
  extract elements each of which corresponds to a respective one of the plurality of antennas as estimated values of the channel responses based on the second antenna-space channel vector that has been divided by the window function.

11. The radio apparatus according to claim 10, wherein the window function is one of a triangular window, a Hanning window, a Hamming window, and a Blackman window.

12. The radio apparatus according to claim 10, wherein a size of the window function is equal to either a size of the first antenna-space channel vector or the number of the plurality of antennas.

13. A channel estimation method comprising:
  calculating an estimated value of a channel response for each of a plurality of antennas;
  generating a first antenna-space channel vector having dimensions larger than the number of the plurality of antennas by combining the estimated value with a padding value;
  calculating a first beam-space channel vector by performing a spatial transformation process on the first antenna-space channel vector;
  generating a second beam-space channel vector by suppressing at least one element included in the first beam-space channel vector;
  calculating a second antenna-space channel vector by performing an inverse spatial transformation process on the second beam-space channel vector, the inverse spatial transformation process being a spatial transformation process in a direction reverse to that of the spatial transformation process; and
  extracting elements each of which corresponds to a respective one of the plurality of antennas as estimated values of the channel responses based on the second antenna-space channel vector.

14. A non-transitory computer readable medium storing a channel estimation program for causing a computer to perform:
  calculating an estimated value of a channel response for each of a plurality of antennas;
  generating a first antenna-space channel vector having dimensions larger than the number of the plurality of antennas by combining the estimated value with a padding value;
  calculating a first beam-space channel vector by performing a spatial transformation process on the first antenna-space channel vector;
  generating a second beam-space channel vector by suppressing at least one element included in the first beam-space channel vector;
  calculating a second antenna-space channel vector by performing an inverse spatial transformation process on the second beam-space channel vector, the inverse spatial transformation process being a spatial transformation process in a direction reverse to that of the spatial transformation process; and
  extracting elements each of which corresponds to a respective one of the plurality of antennas as estimated values of the channel responses based on the second antenna-space channel vector.

\* \* \* \* \*